United States Patent [19]

Tsai

[11] Patent Number: 6,038,566
[45] Date of Patent: Mar. 14, 2000

[54] METHOD AND APPARATUS FOR NAVIGATION OF RELATIONAL DATABASES ON DISTRIBUTED NETWORKS

[76] Inventor: Daniel E. Tsai, 39 Bayberry Dr., Atkinson, N.H. 03811

[21] Appl. No.: 08/982,467

[22] Filed: Dec. 2, 1997

Related U.S. Application Data

[60] Provisional application No. 60/032,773, Dec. 4, 1996.

[51] Int. Cl.$^7$ ..................................................... G06F 17/30
[52] U.S. Cl. ................................... 707/102; 707/3; 707/4; 707/10; 707/100; 707/103; 395/200.31; 395/200.47; 395/200.8
[58] Field of Search ........................... 707/3, 4, 10, 102, 707/103; 395/200.31, 200.47, 200.43, 200.78, 200.8

[56] References Cited

U.S. PATENT DOCUMENTS

| | | | |
|---|---|---|---|
| 5,355,472 | 10/1994 | Lewis | 707/101 |
| 5,499,371 | 3/1996 | Henniger et al. | 707/103 |
| 5,634,121 | 5/1997 | Tracz et al. | 707/2 |
| 5,678,041 | 10/1997 | Baker et al. | 707/9 |
| 5,737,592 | 4/1998 | Nguyen et al. | 707/4 |
| 5,761,663 | 6/1998 | Lagarde et al. | 707/10 |
| 5,778,367 | 7/1998 | Wesinger, Jr. et al. | 707/10 |
| 5,781,739 | 7/1998 | Bach et al. | 709/227 |
| 5,802,518 | 9/1998 | Karaev et al. | 707/9 |
| 5,819,282 | 10/1998 | Hooper et al. | 707/103 |
| 5,826,258 | 10/1998 | Gupta et al. | 707/4 |
| 5,832,498 | 11/1998 | Exertier | 707/103 |
| 5,873,093 | 2/1999 | Williamson et al. | 707/103 |
| 5,878,417 | 3/1999 | Baldwin et al. | 707/10 |
| 5,878,418 | 3/1999 | Polcyn et al. | 707/10 |
| 5,895,468 | 4/1999 | Whitmyer Jr. | 707/10 |
| 5,913,210 | 6/1999 | Call | 707/4 |
| 5,913,214 | 6/1999 | Madnick et al. | 707/10 |

OTHER PUBLICATIONS

Conceptual Schema and Relational Database Design, A Fact Oriented Approach, G.M. Nijssen et al., Department of Computer Science, University of Queensland, Prentice Hall, pp. 10–33, 42–43, 48–51, 156–170, 1989.

Object–Oriented Programming, An Evolutionary Approach, B.J. Cox, Ph.D. et al., Addison–Wesley Publishing Co., pp. 49–52, 69–72, 1991, 1986 (1st edition).

Information Engineering, A Triology by James Martin, pp. 304–305, 310–311, 453–454, 482, 1990.

An Introduction to Database Systems, C.J. Date, Addison–Wesley Publishing Co., pp. 10–11, 28–35, 79–80, 1995.

The Guide to SQL Server, A. Nath, Addison–Wesley Publishing Co., pp. 4–22, 52–61, 92, 1990.

The VRML Sourcebook, A.L. Ames et al., John Wiley & Sons Inc., pp. 1–7, 1996.

(List continued on next page.)

*Primary Examiner*—Jean R. Homere
*Attorney, Agent, or Firm*—Fish & Richardson P.C.

[57] ABSTRACT

Relational databases are browsed in a manner that mirrors the interactive browsing of world wide web pages. A schema-based navigational layer is used on top of conventional physical, logical and conceptual database schema layers, to dynamically map data stored in a relational database onto web pages. The navigational schema or schema base is an independent abstraction from the underlying conceptual database schema. The schema base is constructed from relationships and information models. The schema base can be reused or derived from the database design process or produced specifically for navigation through the database. An object-role schema base is used to demonstrate the traversal of relational information in a regenerative, propagative manner. Navigating a database via the presented schema extends the conventional database concept of the logical view to an interactive model of logical view-transitions. The technique is a simple and powerful model for automated access to relational databases making available vast amounts of data stored in relational databases for Internet and intranet web browsing.

24 Claims, 16 Drawing Sheets

OTHER PUBLICATIONS

A Dynamic, Schema–Independent Web Interface for a Relational Database, R.W. Lee et al., Computer Science & Mathematics Division, Intelligent Systems Section, Oak Ridge National Laboratory, pp. 1–15, 1996.

Genera Schema Notation:, pp. 1–15, S.I. Letovsky, http://www.agron.missouri.edu/docs/gendocs/genera, 1994.

"Object–Oriented Analysis and Design with Applications", G. Booch, Benjamin/Cummings Publishing Co., 1994, pp. 155, 156, 179–183.

"The Logic of Architecture", W.J. Mitchell, Massachusetts Institute of Technology, 1990, p. 139.

"Strategic Database Technology: Management for the Year 2000", A.R. Simon, Morgan Kaufmann Publishers, 1995, pp. 6–9, 14–17, 55–57.

"Webcrawler", Global Network Navigator, Inc., 1996, pp. 1–3.

"About Altavista", Digital Equipment Corporation, 1996, pp. 1–3.

"Destination Anywhere", J.D. Rege, Oracle Corporation, 1996, pp. 1–3.

"Benefits of X–based Three–Tier Client/Server Model with ESRI Applications", A. Reiner et al., Virtual Solutions, 1995, pp. 1–4.

14 — States:  {s1, s2, s3}
18 — Transitions: t1(s1,s2), t2(s1,s3)

24 — Pages: {page1, page2, page3}
28 — hotlinks: link1(page1,page2)
　　　　　　　link2(page1,page3)

Data Objects:

Level 1: relational entities and relationships.
Level 2: logical view of information = an information state.
Level 3: conceptual objects and relationships between objects
 (shown as object-role model)
Level 4: browsable pages.

FIG. 16

```
Netscape - [Sailboat]
File  Edit  View  Go  Bookmarks  Options  Directory  Window  Help
Back | Forward | Home    Reload | Images | Open | Print | Find    Stop
```

Andy Green

Visited Hospital

1. The Kid's Hospital(1996.10.01-1996.10.01)

Suffered from

1. Bronchiolitis on 1996.10.01

Treated By

1. Dr. Joanne Katz on 1996.10.01

Bronchiolitis suffered by Patient

1. Andy Green
2. John Kelly
3. John Kelly

General Information

1. inflammation of the smaller branches of the bronchial tree
2. First cold symptoms
3. A few days later, rapid, shallow breathing, wheezing on breathing out, low-grade fever for about 3 days
4. sometimes: Chest does not seem to expand with breathing in; pale or bluish color
5. susceptibility: Greatest in those under 2 years, especially under 6 months.

FIG. 20

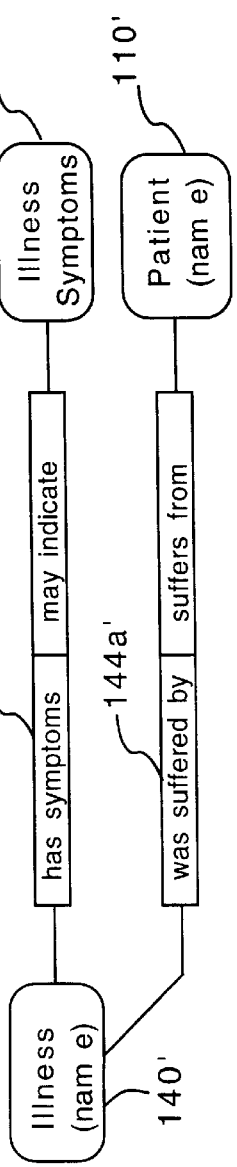

FIG. 21

METHOD AND APPARATUS FOR NAVIGATION OF RELATIONAL DATABASES ON DISTRIBUTED NETWORKS

This application claims the benefit of the filing date of U.S. Provisional Application 60/032,773 filed Dec. 4, 1996.

BACKGROUND

This invention relates to data retrieval systems for use on networks.

The so-called world wide web has become a popular medium to deliver information on-line. The world wide web also referred to as the "Internet" offers users a simple and intuitive way of browsing multimedia information arranged as web pages. A web page includes information and hyperlinks or connections to other web pages. Pages for delivering information can be implemented on private internets, commonly referred to as "intranets." In either the Internet or intranets, the types of multimedia data that can be accessed has grown from text and bit map images to include sound, digital video, interactive video and virtual reality. Information on the world wide web is presented as multimedia pages and interaction is performed through selecting active elements such as buttons, hyperlinked words, and image maps.

Access to the Internet is generally provided with a client-server computer system model. Generally a server computer provides services such as internet access for client computers. The client computers have web browsers that couple the client computer to the server computer and permit users to access various resources available on the Internet or an intranet. One of the resources can be local or a remote database server having a text-based database or a relational database or other types of databases.

One technique used on the world wide web to access databases uses embedded structured query language commands (SQL) and proprietary language in authored hypertext pages that are parsed by an augmented hypertext server and passed to a database server for execution. Another technique employs templates to specify queries and formatting for database searches. Finally, program gateways such as Hypertext Transfer Protocol Device—Common Gateway Interface (HTTPD-CGI), the most common gateway interface, allow programs to be executed by the server in response to a hypertext request. While these examples of web-based database access provide fundamental connectivity between hypertext servers and databases, they do not take full advantage of the wide range and rich offerings available on the Internet.

SUMMARY

According to one aspect of the invention, a schema base data structure to interface a database to a web browser, permitting the web browser to navigate through the database includes first and second fields for representing referencing and referenced object classes and a relationship field for representing a relationship between the first and second objects. The data structure also includes extraction command fields to retrieve instances of the class from an underlying database and use rules for parsing parameters used in the database retrieval.

According to another aspect of the invention, a method of operating a web browser to retrieve information in a database, in a computer network comprises providing a schema base which represents information in the database as classes of objects and relations between classes of objects, executing one or more search queries for a selected instance of a class object, and generating a web page to place hyperlinks on the page corresponding to relationships between selected objects and object instances in the schema.

According to a further aspect of the invention, a method of operating a web browser to retrieve information in a text-based or a relational database in a computer network includes selecting a named class of objects from a plurality of available named classes of objects contained in a schema base and retrieving relations from the schema base defining the roles played by the selected named object class in relation to roles played with others of the plurality of named object classes contained in the schema base. The method also includes executing one or more search queries for each found named class occurrence from the schema base, retrieving instances of related named objects identified by a relation between the selected named object class and generating a web page to place hyperlinks corresponding to the relationships between the selected named object and other object instances in the schema.

One or more advantages are achieved with the foregoing. Databases such as text-based or relational databases are browsed in a manner that mirrors the interactive browsing of world wide web pages. The schema-based navigational layer dynamically maps data stored in a database onto web pages. The schema base can be reused or derived from the database design process or produced specifically for navigation through the database. Navigating a database in this manner extends the conventional database concept of the logical view to an interactive model of logical view-transitions. The technique is a simple and powerful model for automated access to databases making available vast amounts of data stored in databases for Internet and intranet web browsing.

DESCRIPTION OF THE DRAWINGS

The foregoing features and other advantages of the invention will be more fully understood when described in conjunction with the accompanying drawings, in which:

FIG. 16 shows a web page navigated to by selecting an instance from the web page of FIG. 12;

FIG. 20 shows a sixth page for the example of FIG. 11;

FIG. 21 shows the accompanying object-role schema used to produce the page representation for FIG. 20.

DETAILED DESCRIPTION

As will be described conventional databases such as, for example, text-based or relational databases can be accessed by a navigation program. The navigation program uses a schema base implemented on top of the database to provide an interface between a web browser on a client computer and a local or remote database.

Figure 1:
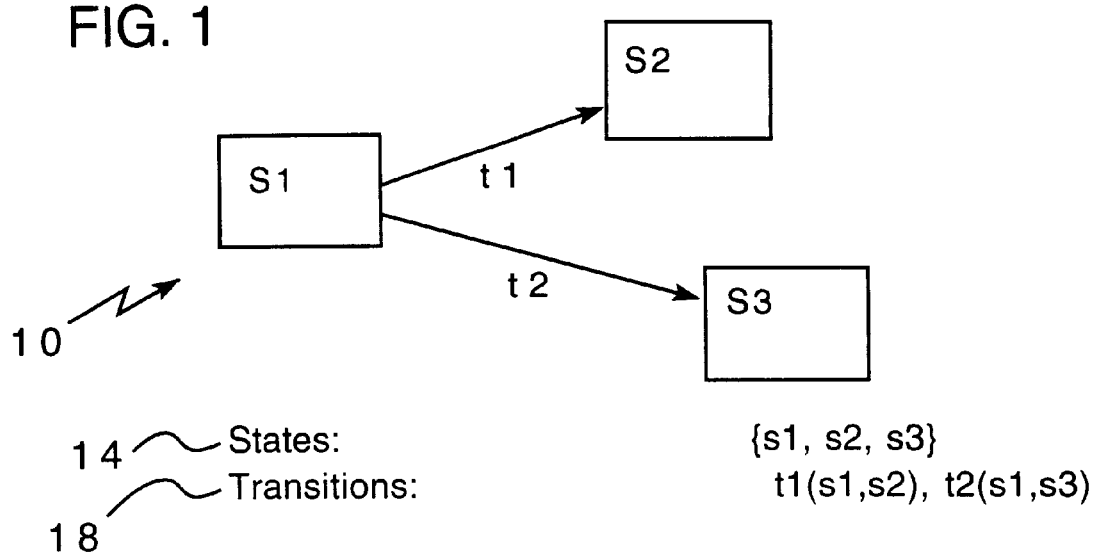
FIG. 1 is a diagram showing generalized state transitions.
Figure 2:
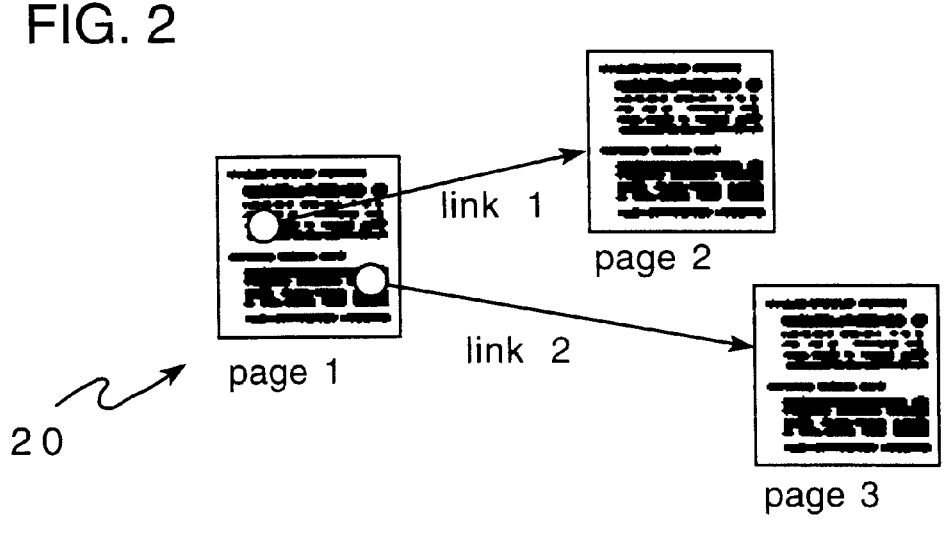
FIG. 2 is a diagram showing page transitions as changes in state; 9

Referring now to FIGS. 1 and 2, browsing of the world wide web can be modeled as a state transition model. Web browsing is stateless. In a client-server computing model the server does not need to know the state of the client in order to satisfy a request from the client. From a user's perspective, browsing information on the web is stateful, that is, each page represents an information content state. Activation of a hotlink or hyperlink results in a change of the information state shown on the display of the page. Therefore, web browsing can be modeled 10 as comprised of content states 14 and resource transitions 18. This is illustrated in conjunction with FIG. 1 showing states S1, S2 and S3 and a transition T1 corresponding to a transition from state S1 to state S2 and a transition T2 corresponding to a transition state S1 to state S3.

A content/transition model 20 of a web page is developed by modeling each page as an information state and each hyperlink as a possible transition from a current state or page to a subsequent state or page. As illustrated in conjunction with FIG. 1 the pages 24 correspond to "page 1", "page 2" and "page 3" and the hotlinks 28 correspond to "link 1" inking "page 1" to "page 2" and "link 2" linking "page 1" to "page 3."

A web page is an authored "hypertext" document which is generally produced by a page authoring tool. Pages can be produced manually or dynamically by executing programs that produce formatted content on demand. A page is abstracted to represent a conceptual object not a programming object but simply a bounded conceptual unit. A page is a unit of information, therefore, distinguished by size as well as coherent topics. Viewing a page can be translated into viewing the information contained in the object that embodies the page's topic. Thus, for example, viewing a page entitled "hospital" can be thought of as asking an object to display information about the topic "hospital." HTML pages are linked together by hotlinks or hyperlinks. Hotlinks are intentional interconnections between pages. They can be viewed as specifying relationships between information on one page and another. In a page model, hotlinks serve the same purpose. Hotlinks can be considered as relationships or roles between objects. For example, any two objects may be connected by a relationship. As an example, consider the statement:

---
Object 1 (painting, Mona Lisa) --- relation
(is on display at/contains) --- Object 2 (museum, Louvre)
---

Therefore, assume that a page entitled the "Mona Lisa" is accessed by a server computer. The page is expected to provide information focused on the painting "The Mona Lisa." This information may include facts that Leonardo Da Vinci painted it and thus the words "Leonardo Da Vinci" may be hotlinked to a page focused on him. Correspondence, therefore, exists between the information on the page Mona Lisa and other information underlying it. Viewing pages as conceptual objects can have the information represented on the page as page links to other related objects. This begins to associate browsing web pages and browsing conceptual objects.

The next step is to specify how an underlying data representation maps to conceptual information objects and to browsable web pages. Conceptual objects are implemented as programs and the schema base that act dynamically to provide content. Pure object databases eliminate impediments to translating real world object models into an implemented database. Although relational databases do not satisfy the object model, nevertheless, they are well-established, standardized and extensively used on the world wide web.

Figure 3:
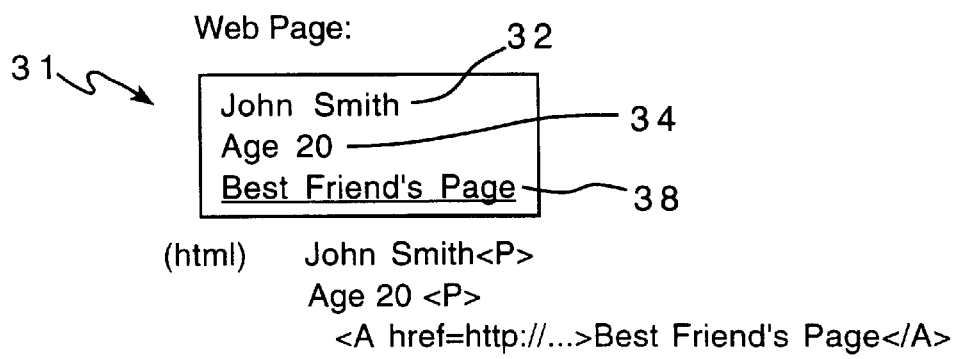
FIG. 3 is a diagram showing a simplified hypertext page with underlined hyperlinked text.
Figure 4:
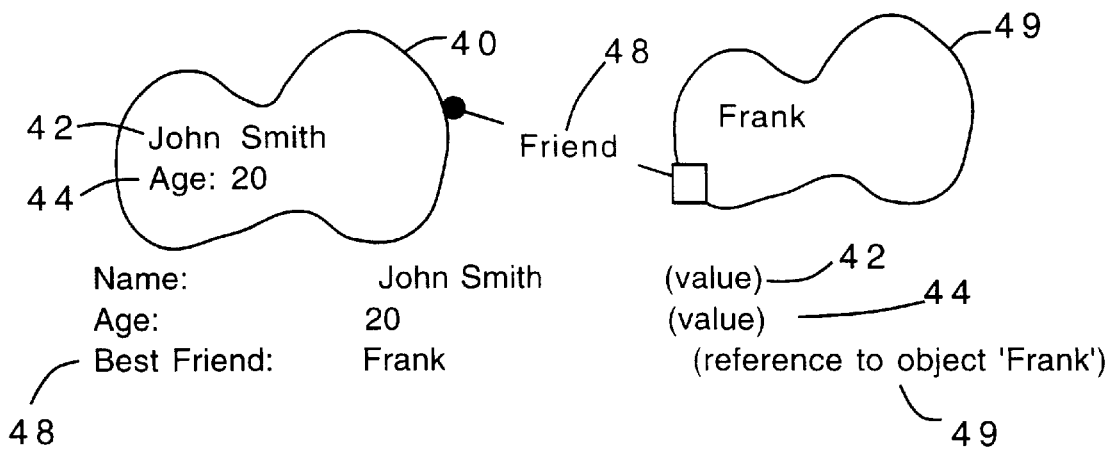
FIG. 4 is a diagram in Booch notation showing related objects.
Figure 5:
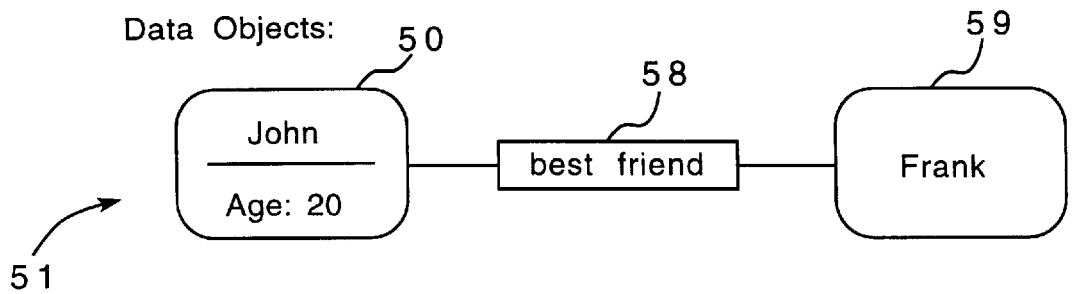
FIG. 5 is a diagram showing data objects in a relationship.

Referring now to FIGS. 3–5, the contents of both web pages and objects can be viewed as being intrinsic, that is, owned by the web pages or objects, or extrinsic, that is, referenced by the web page or to another object. As shown, the intrinsic contents "John Smith" 32 and "age 20" 34 are displayed on the page 31. That is, an object can contain information by either value or reference. In addition, its extrinsic contents 38 are also displayed on the page 31 as a reference, hotlink or hyperlink 38 "Best Friends page." An object can contain information either by value or by reference. Thus, for example, viewing the web page 31 (FIG. 3) as a programming object 40 (FIG. 4) shows the object 40 containing all of the intrinsic information displayed on the page 30 (FIG. 3), that is, "John Smith" 42 and "age 20" 44 as well as extrinsic information corresponding to hyperlink 38 (FIG. 3) expressed as a relation 48. The object 40 is connected to a referenced object 49 "Frank" by relationship "friend" 48. The information on the web page can also be represented 51 as a data object 50 (FIG. 5) linked by a link 58 to a page "Frank" 59.

Figure 6:
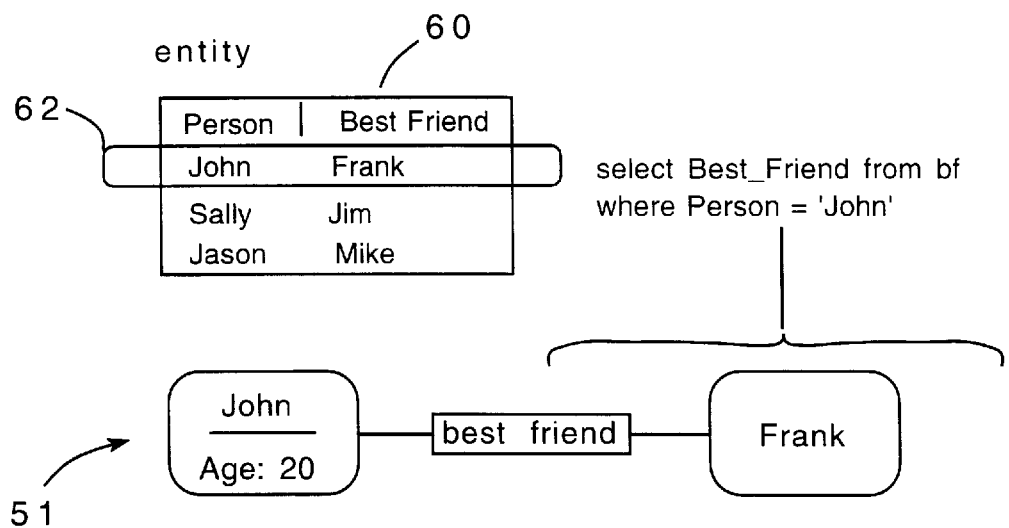
FIG. 6 is a diagram showing the instantiation of a data object from a table.

As shown in FIG. 6, extrinsic information can be retrieved via relations to other owning objects. Thus, the information specified by a link between two objects can be retrieved as a relational query. Thus, the relational query 62 in the relationship table "entity" 60 can retrieve information specified by the link between the objects "John" and "Frank." The link can be viewed as a relational query such as:

select "Best_Friend from BF where person='John'."

The result or satisfaction of the relational query is represented by the linked data object 51 as was shown in FIG. 5.

Figure 7:
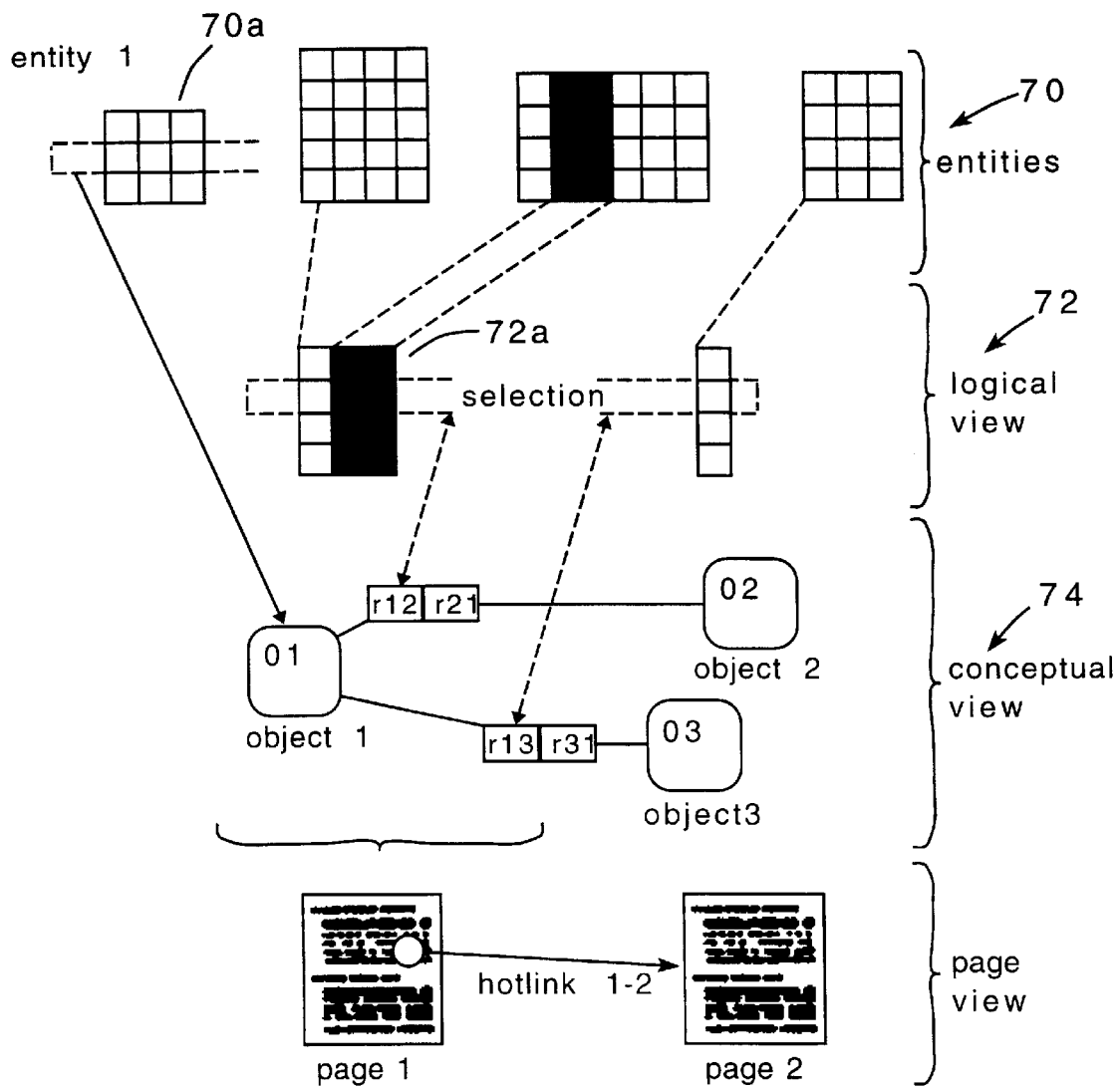
FIG. 7 is a system diagram showing the relationship between information at four levels: entities, logical views, conceptual views and page views.

Referring now to FIG. 7, relational data in a relational database 70 is presented as a set of logical views 72. In particular, the entities 70a which represent information in tables in a relational database can be extracted into logical sets 72a of information represented by the logical view 72. The logical sets 72a of information are the result of a query of the relational database using the relational entities in the database and relationships between the entities. Each of the logical views 72 can represent extrinsic or intrinsic information for a conceptual object as illustrated for the conceptual object view 74. Any conceptual objects data can be formed from a collection of queries to the underlying database.

Thus, as shown in FIG. 7, the object 1 intrinsic data can correspond to the entity 1, whereas the selection criteria for its extrinsic data in the logical view can be represented by the relationships R12, R21 and R13, R31. As in the logical view of the relational database, the object conceptual view shows (as in the object role model) the relationships between "object 1" and "object 2" and "object 1" and "object 3." These relationships are R12, R21 and R13, R31, respectively. The objects are modeled as units that have distinct properties in relationship to other objects.

The object is defined by its intrinsically possessive properties as well as by its connections to other objects. A web page, on the other hand, is a composite of material formed from sources distributed over a network. The web page generally has one main page with embedded links and resources. Here the intrinsic information for the conceptual object corresponds to a browsable web page, whereas, relationships between objects correspond to the links on the web. The links on the web page, therefore, can trigger a new set of queries concerning the data represented by the relational database.

Browsing on the web relies upon the ability to navigate, that is, move from one page to another page among a set of pages. Navigational moves are determined by the embedded links on a particular page.

Therefore, moving from one page to another is a request for content as satisfied by the underlying relational database. The hyperlinks can be regenerative links, that is, they dynamically hook back into the database based upon a conceptual object module or a schema base 30 (FIG. 22) that overlies the database. Each information state is a snapshot of information in the database. The action of browsing is the combination of visiting pages and following links between the pages. This sequence of states and transitions can be mapped to sequences of logical view states and transitions to other view states. Displaying of individual states of information is the result of a collection of query/logical views. The relation model, likewise, defines transitions between information states. A relation is specified in relational database theory by relational algebra or in practice by a structured query language (SQL). The inherent structure of information formed as a relational model can be used to provide traversable links during the act of browsing web pages.

Figure 8:
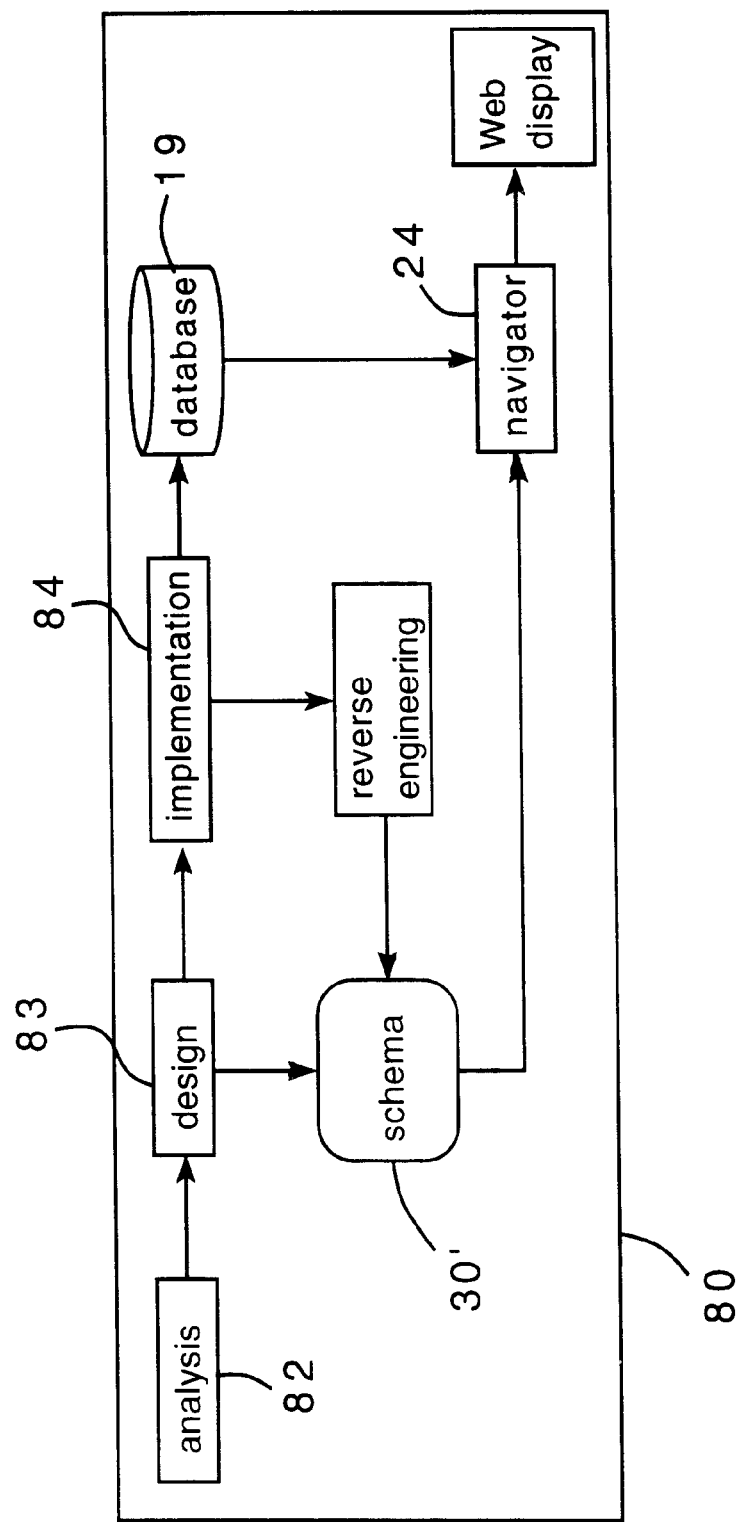
FIG. 8 is a diagram showing a technique for generalizing a schema base.

Referring now to FIG. 8, a technique 80 for generating schemas based upon a design of a database 19 is illustrated. The technique involves reverse engineering of an analysis 82, design 83 and implementation 84 of a database 19 to produce a schema base 30. That is, FIG. 8 shows a possible approach between database design information and its use in developing a schema for use with a navigator 24 for implemented databases. This is one way to leverage design data in the production of a schema base 30. The schema base 30 can also be constructed without such a process and irrespective of any design data, as done in the example to follow.

A simplified object-role representation permits the use of object-role design tools that reverse engineer object-role base constructs. The schema 30 is used with a navigator 24 to interface the database 19 to a web page display (browser). A well-known object role model is suitable for implementing a schema database 30. The object role model embodies similar concepts with object oriented models of programming and as used herein the term "object role" refers to a general use of the term object and role as a relationship between objects.

Objects are viewed as belonging to a particular class. The navigational program that operates on schema base 30 will find all relationship/roles that a particular class can possess and once the program 24 finds such relationships, it will fill in each of these classes with particular instances of the class. In addition, if the classes in the binary relation are the same, then a recursive retrieval can be supported in the schema. For example, the self-referencing rule:

schema(Part, Part, subpart of, 'Select part.name where name = part.subpart and name=%s')

can be used to traverse recursive data including grammar specifications.

TABLE 1

| Part | Subpart |
| --- | --- |
| Pedestal | Base |
| Pedestal | Dado |
| Pedestal | Cap |
| Column | Column Base |
| Column | Shaft |
| Column | Capital |
| Entablature | Architrave |
| Entablature | Frieze |
| Entablature | Cornice |
| Capital | Necking |
| Capital | echinus |
| Capital | Abacus |
| Base | plinth |
| Abacus | cymation |
| Abacus | fillet |
| Necking | cincture |
| Necking | astragal |
| Necking | fillets |

Thus, recursiveness is shown where a part such as "pedestal" is defined in terms of other parts such as "base", "dado" and "cap." The part "base" is in turn defined by "plinth." Browsing this information would resolve to instantiating the next subpart of an instance of class(Part). The results can be shown textually or graphically.

In addition, multiple, distinct or connected schemas can co-exist. Thus, each rule in a schema base can be identified by a category and/or an owner's schema:

schema{class 1, class 2, relation 12, extraction, owner}

In addition, this approach can support multiple, separate or combined pathways. A set of schemas can be chosen as well as rules to choose the schemas can be provided to customize navigational pathways. The schema base 30 specifies how each page is hotlinked to access a next logical retrieval of information. Each page object is viewed as one state of retrieved information. Inherent connections between objects, i.e, "roles" between objects specify a logical relationship between the objects. The schema base 30 not only specifies what information should be retrieved to represent information about the object, but it also specifies what relations or roles to other objects can follow. These relations or roles are translated into hotlinks that appear on web pages.

The relational database navigator model will now be described with respect to FIGS. 9–23. As an illustrative example, information regarding hospitals is presumed to reside in a local database and/or in a relational database on a remote database server. Techniques for developing a schema base 30 to represent the information in the relational database and to interface that information to a web browser will be described. This example will demonstrate how an object-role schema base maps relational data from a relational database onto web pages and how it draws its information from the relational database. The database is navigated, that is, browsed with each page's contents and links as they are generated. The schema base 30 is independent of the underlying database. The schema base 30 is provided as a level on top of the physical and logical levels of the database. Therefore, the underlying relational data models do not have to be unified.

The schema base 30 (FIG. 22) is built and interposed between the relational database and a web browser. The schema base 30 maps the act of browsing web pages to querying a database. The schema base 30 is a collection of objects and relationships between the objects. The schema base 30 could specify some or all permitted states and transitions of the conceptual database. Relational database metadata information resides in system tables and is often referred to as "conceptual schema." Conceptual schema is distinguished from the described schema base 30. A "schema base" refers to meta information about all conceptual objects, relationships between objects and extraction of information to satisfy requests for this information from an underlying relational database. The schema base 30 includes a set of schema rules, the schema rules having the form:

---
schema rule: {class 1, class 2, relation 12, extraction, propagation}
---

An example of a schema rule using a hospital information database would be:

---
Doctor, patient, treated, 'Select Patient from patientTreatment where Doctor=%s';
Doctor, Hospital, practices, 'Select Hospital from Doctors where Doctor=%s', propagate (Patient);
---

Figure 9:
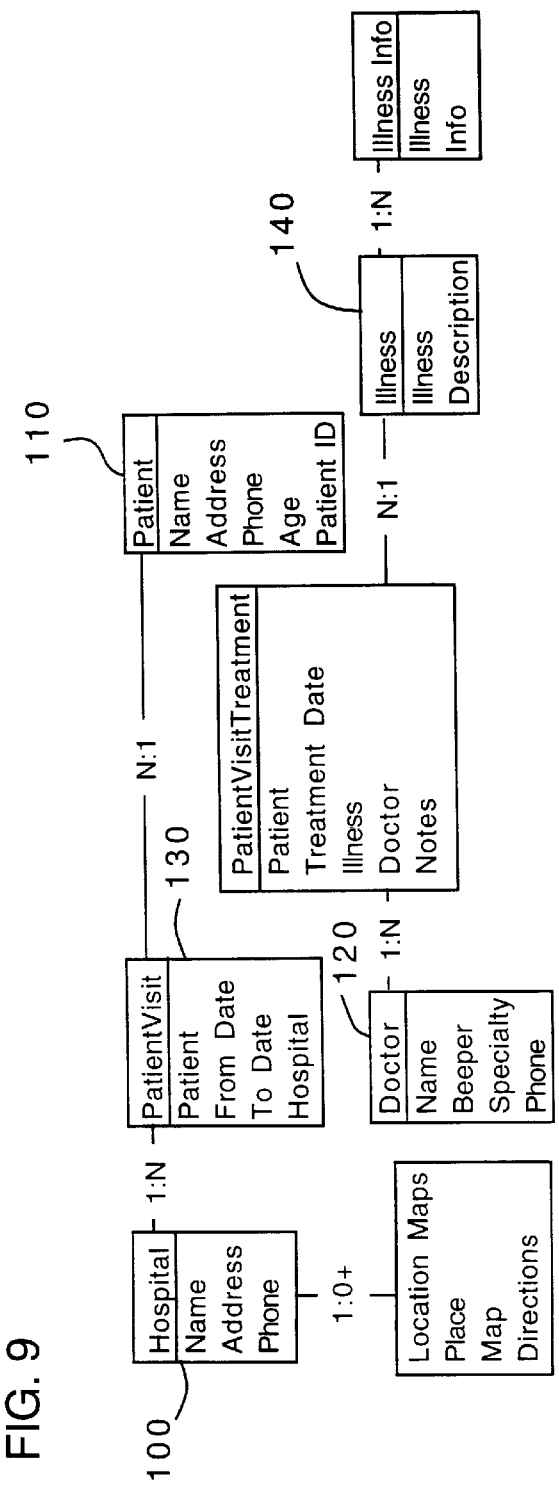
FIG. 9 is a diagram showing an entity relationship model of an example database.
Figure 22:
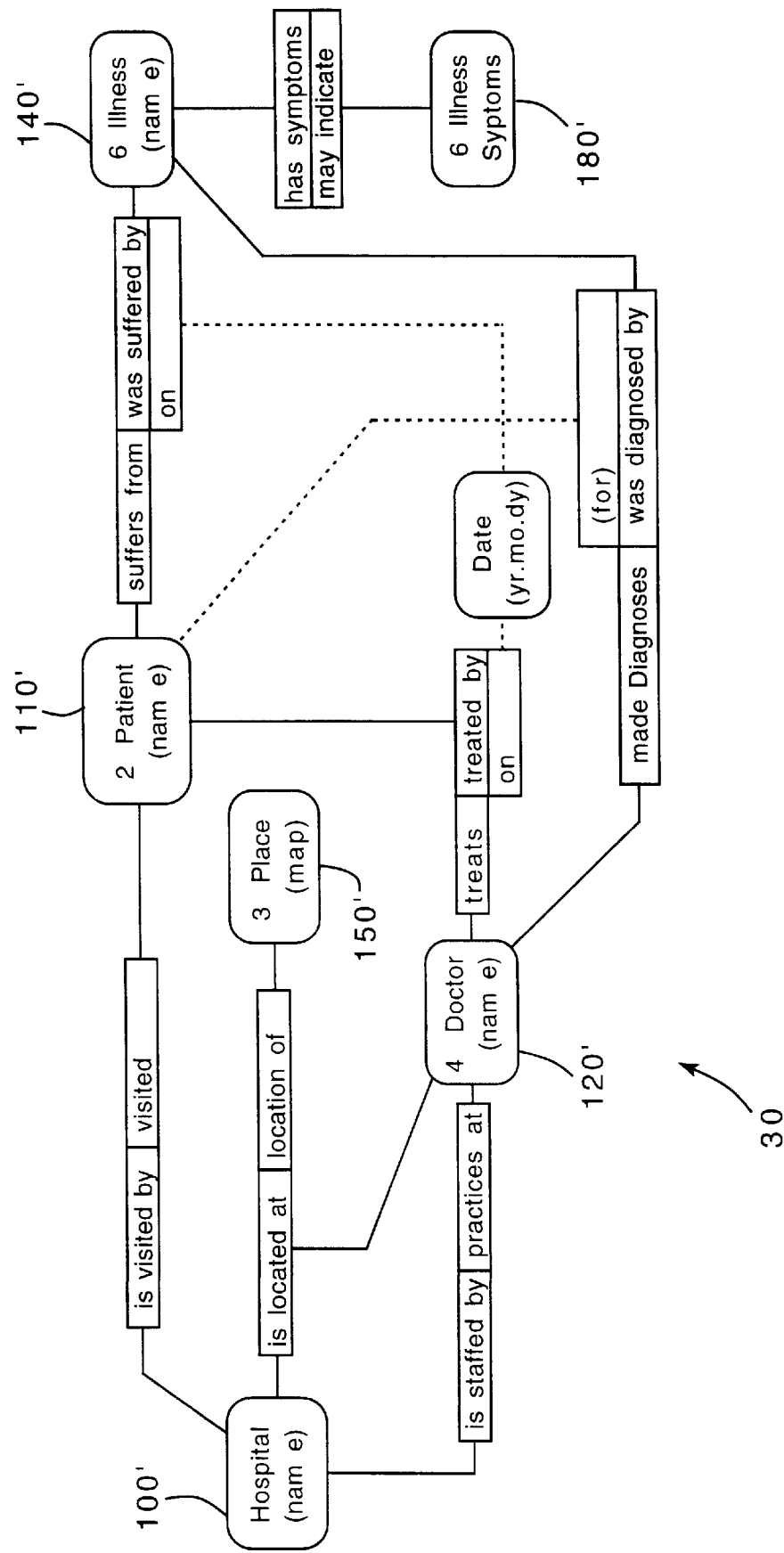
FIG. 22 shows the combined object-role schema used to navigate the demonstrated sequence of pages.

Referring now to FIG. 9, an illustration of a relational database includes various tables storing information in fields. In particular, the table 100 "hospital" has fields "name", "address", "phone." Additional tables are also provided such as, for example, patient 110, doctor 120 and so forth. These tables along with their respective relationships are used in development of a schema to define conceptual objects for the schema base 30 (FIG. 22). Thus, the table "hospital" 100 and table "Patient" 110 and a table "Patient Visit" 130 along with their respective relationships are used to define the role 102 "Patient-Visited-Hospital" for the conceptual object "patient" and the conceptual object "hospital", for example. A second role 112 for "patient" as a conceptual object is shown for example by the role "Patient-suffered from-Illness" which involves other tables and relationships.

Figure 10:
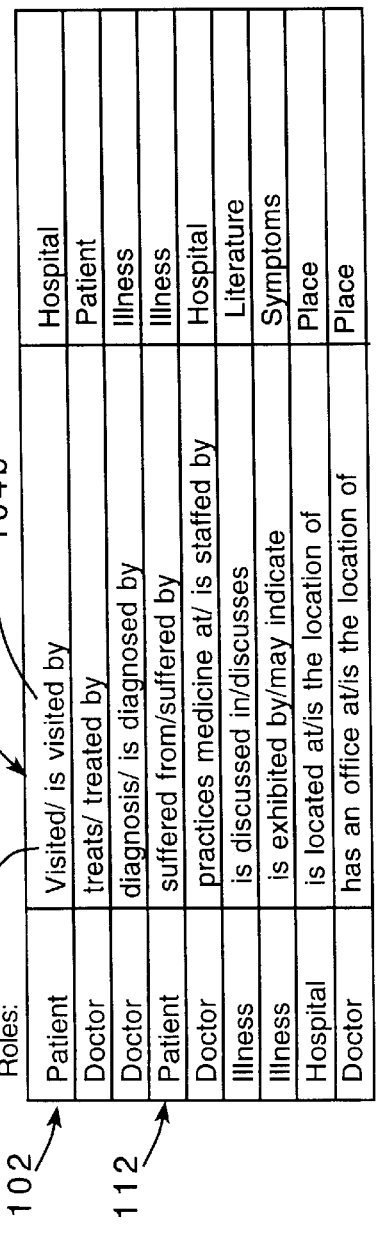
FIG. 10 is a table showing roles between conceptual objects in an example database.

The relationships between the various tables are classified as a relation type. Thus, between the tables "patient visit" 130 and "patient" 120 there is a many to one relationship denoted as N:1; whereas, between the table "hospital" 100 and "patient visit" 130 there is a one to many relationship denoted as 1:N. The relationships between the hospital table 100 and the patient table 110 can be used to construct roles, as shown in FIG. 10. Thus, for example, one illustrated role set 104 "visited"/"is visited by" involves tables patient 110 and hospital 100. This is a duality in that for the statement "object 1-role-object 2" this provides the role 104a "patient visited hospital" when hospital is the referenced object or the role 104b "hospital visited by patient" when patient is the referenced object. Additional roles are shown in FIG. 10.

Figure 11:
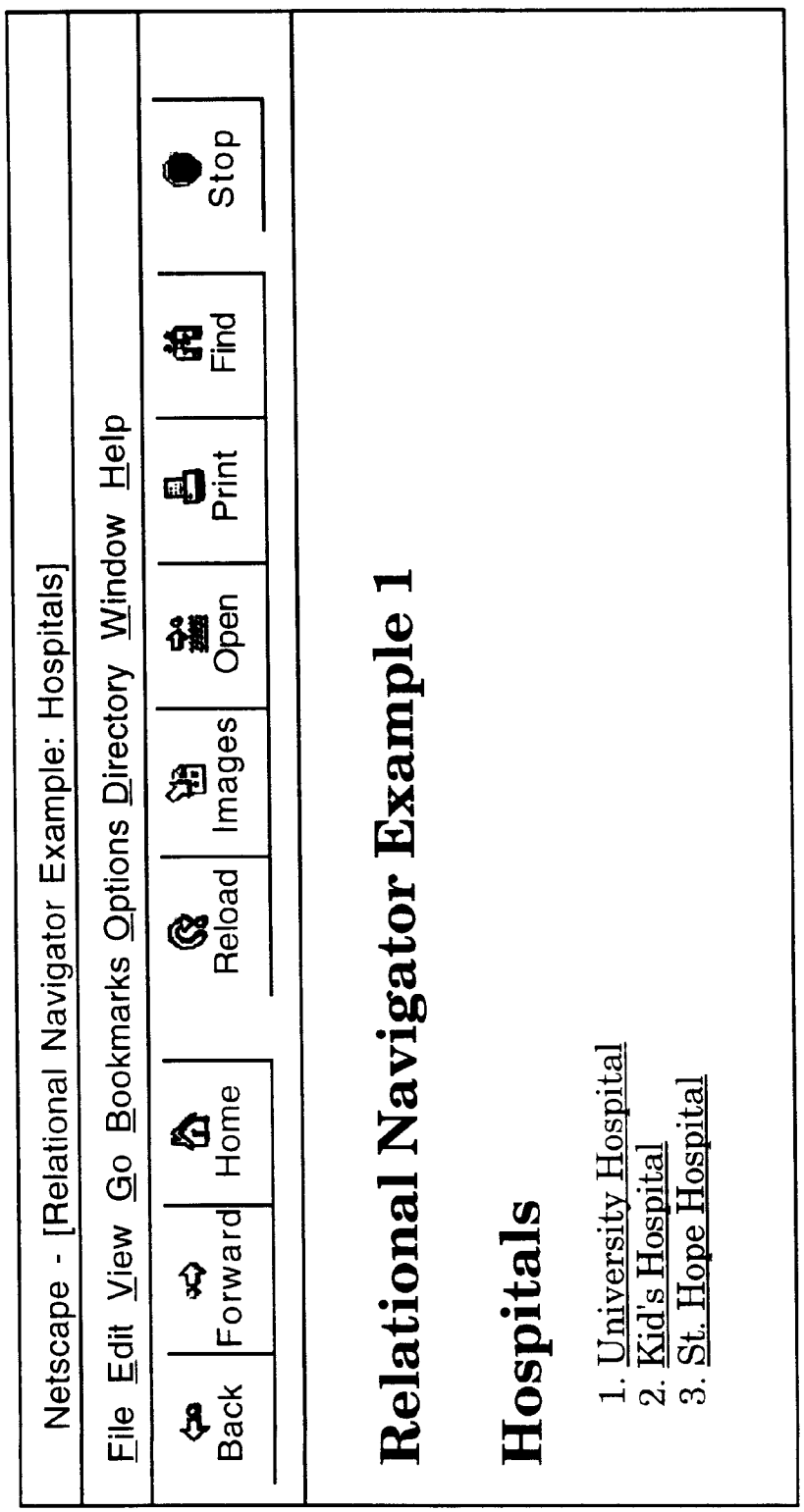
FIG. 11 shows an initial web page representing the class "hospital" for the example database.

Referring now to FIG. 11, as an illustrative example browsing through a relational database 19 called "hospitals" will be described. The relational database 19 is on a remote server. Initially, in this example, a starting web page "hospitals" is shown. Here three hospitals are listed, "University Hospital", "Kids Hospital" and "Saint Hope Hospital." Each of these are hyperlinks that dynamically form a page for the respective hospital. Here the initial page (FIG. 11) is a static page having no information other than hyperlinks to other pages. Selecting one of these hyperlinks invokes a request or query to find information about the class "hospital" for the particular object or instance selected. Thus, for example, selecting "Kids Hospital" is a request to find information about the class "hospital" and the particular object "Kids Hospital." Selecting "Kids Hospital", selects a hyperlink to the "Kids Hospital" page as illustrated in FIG. 12.

Figure 12:
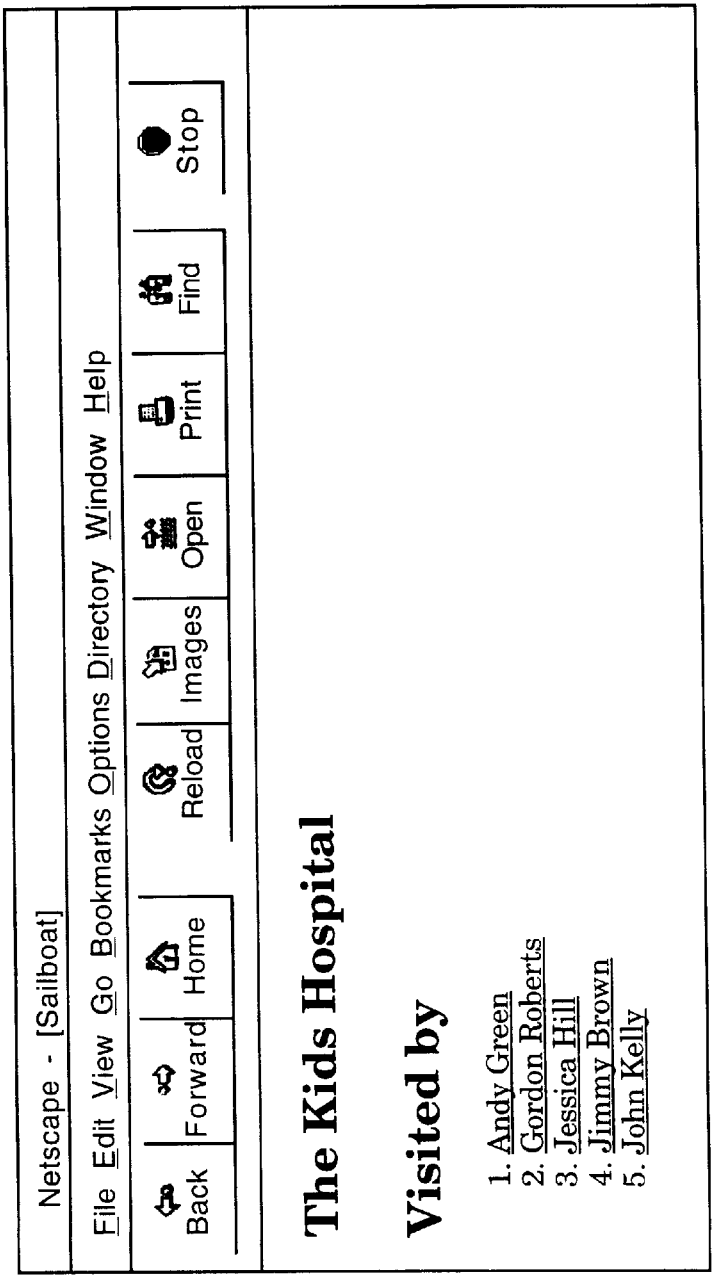
FIG. 12 shows a second web page navigated to by selecting an instance from the web page.

Referring now to FIG. 12, the "Kids Hospital" page includes information, for example, the names of the patients "visited by" the Kids Hospital. There are five names of persons "visited by" the "Kids Hospital." The new page Kids Hospital is dynamically produced by finding relations "visited by" between the class hospital, in this instance, Kids Hospital, and other objects in the database. In this case, the Kids Hospital was "visited by" the list of people.

Figure 13:
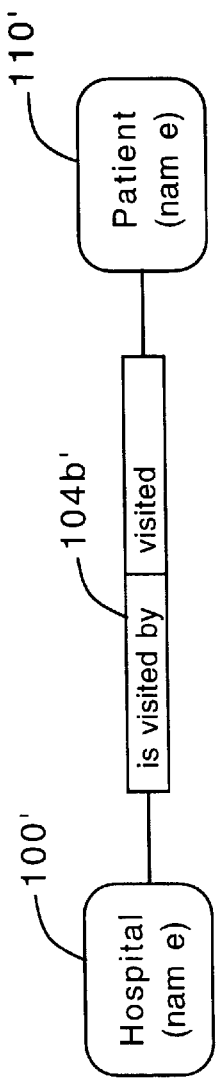
FIG. 13 shows the accompanying object-role schema used to produce the page representation for FIG. 12.

The schema base for this page is shown in FIG. 13 with the object 100' and the object 110' linked by relationship 104b'. The objects 1001 and 110' correspond to the information in tables 100, 110 and 130 (FIG. 9) and are hyperlinked 104b' via the relationship "visited by" 104b (FIG. 10). Parenthetically, if a patient page is accessed the relationship "visited" would link the instance of the class "patient" to the instance of the class "hospital." This will be further illustrated in conjunction with FIG. 16.

Figure 14:
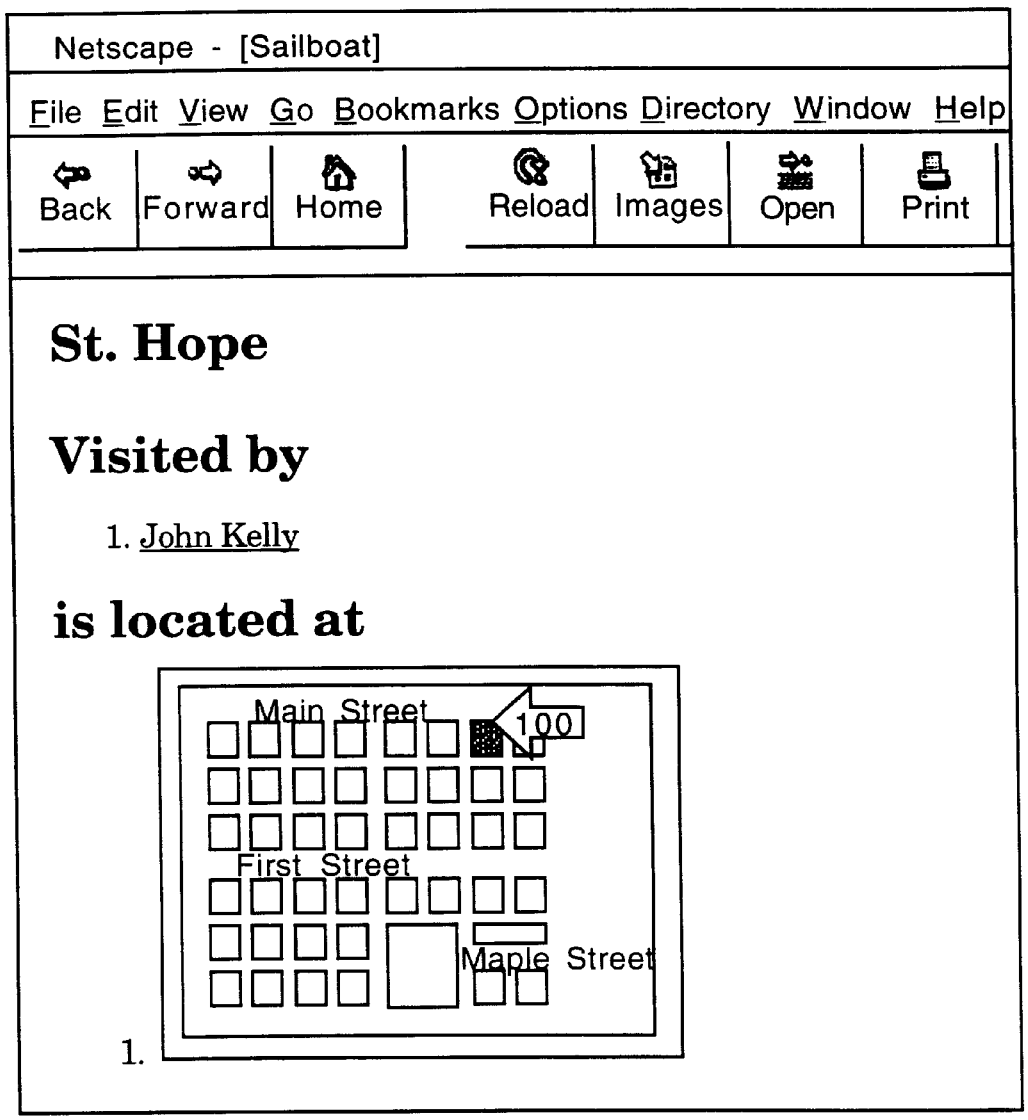
FIG. 14 shows a third web page navigated to by selecting a different instance from the web page.

Referring now to FIG. 14, a second example is shown. The class "hospital" instance "Saint Hope Hospital", as illustrated in FIG. 11, is selected. Retrieval provides information which is found on a dynamically generated Saint Hope Hospital page, as illustrated in FIG. 14. The retrieval finds that the hospital "Saint Hope" is located on a location map. This example shows that two objects of the class "hospital" can retrieve different types of information based on the availability of the information. This use of a location map illustrates the use of multi-media complex data types such as images and maps.

Figure 15:
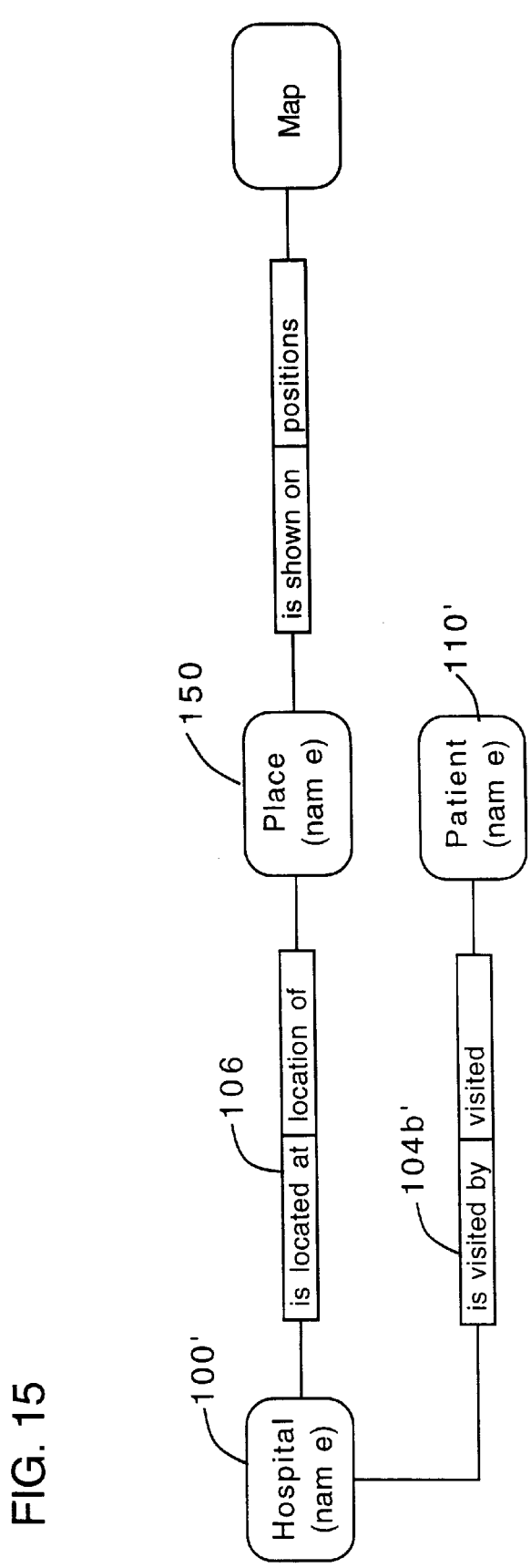
FIG. 15 shows the accompanying object-role schema used to produce the page representation for FIG. 14.

The underlying schema base for the page "Saint Hope Hospital" is shown in FIG. 15 where the hospital object 100' has a relationship 106' "is located at" to an object "place" 150' which has a relationship to a "map" via the relationship "is shown on." The object "hospital" 100' instance "Saint Hope", has a relationship to the object "patient" 110' via the relation "is visited by" 104b' producing the instance "John Kelly." Thus, this example using the "Saint Hope Hospital" produces for the class hospital instance Saint Hope two types of information, the patients who visited the hospital and the location of the hospital. Whereas, for the "Kids Hospital" the information regarding location was not available on the "Kids Hospital" page.

Referring now to FIG. 16, a page "Andy Green" is illustrated. This page is accessed by activating a hyperlink "Andy Green." This hyperlink "Andy Green" is illustrated on the "Kids Hospital" page (FIG. 12). The Andy Green page shows three pieces of information concerning "Andy Green", the "visited" hospital, the conditions "suffered from", here bronchiolitis and the treating physician, "Dr. Joanne Katz." As can be seen in this example, by selecting Andy Green from the Kids Hospital, a return-type linking is provided in which the visited hospital (Kids Hospital) now becomes a link in the "Andy Green" page. This is a link back to the "Kids Hospital" page.

Figure 17:
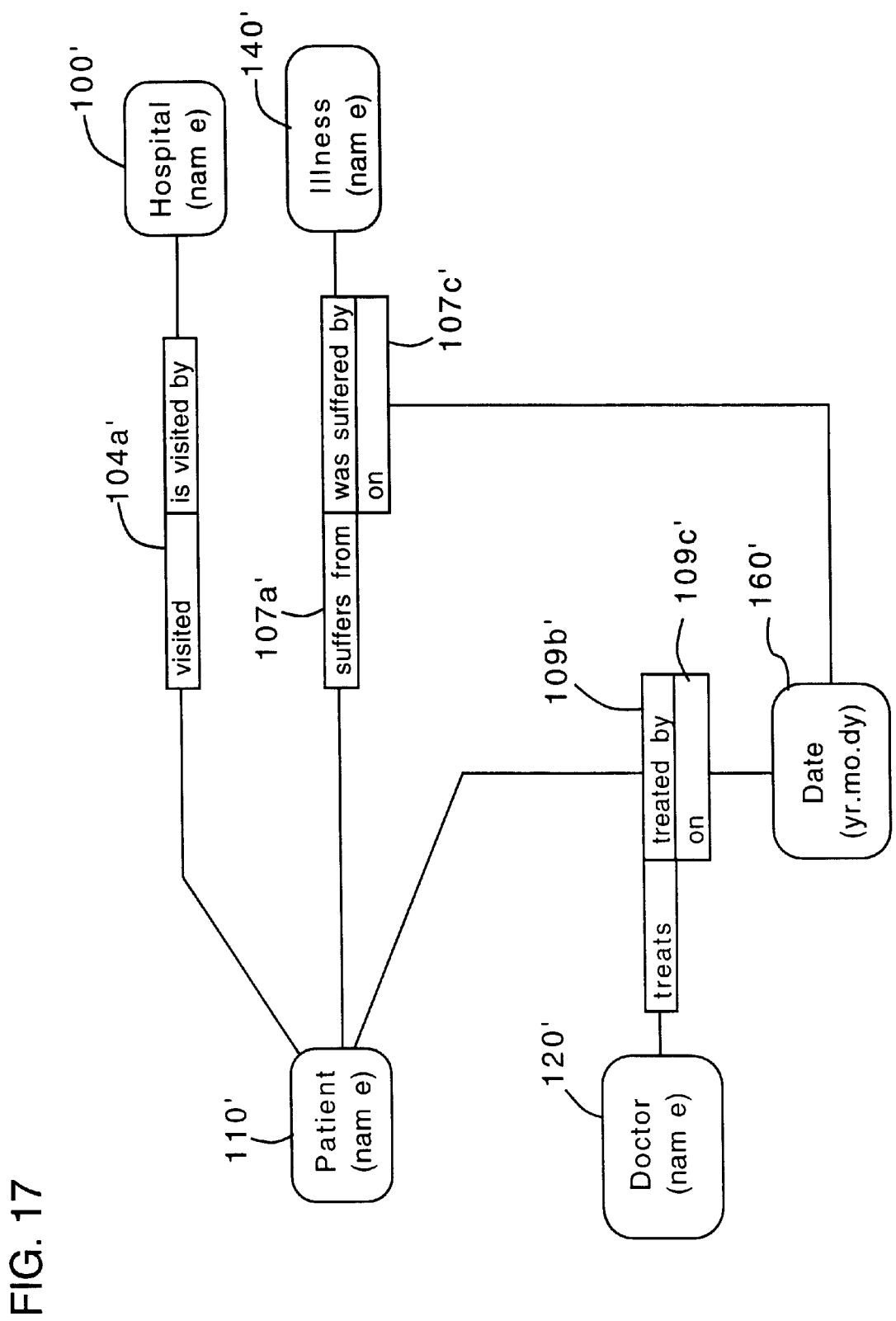
FIG. 17 shows the accompanying object-role schema used to produce the page representation for FIG. 16.

The schema diagram which implements the Andy Green page is shown in FIG. 17. It includes the class patient 110' with the relationship "visited" 104a' linking to the class "hospital" 100'. This particular linking is the return linking of that shown in conjunction with FIG. 13. Additional linkings are also provided for other information on the page, thus, the class "patient" 110' is linked from a relation "suffered from" 107a' to an object "illness" 140' and the object "patient" 110' is linked by a relationship "treated by" 109b' to a "doctor" 120'. The object "date" 160' is linked via the "on" relationship 109c' and the "on" relationship 107c'. This schema shows that the relationship between objects "doctor" and "illness" and objects "patient" and "illness" are both tertiary relationships that include a date. This example can be explicitly extended to handle any number of relationships.

Figure 18:
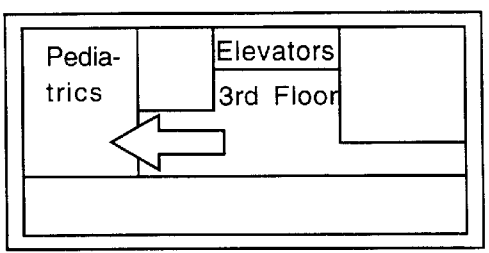
FIG. 18 shows a fifth web page navigated to by selecting an instance from the web page of FIG. 16.
Figure 19:
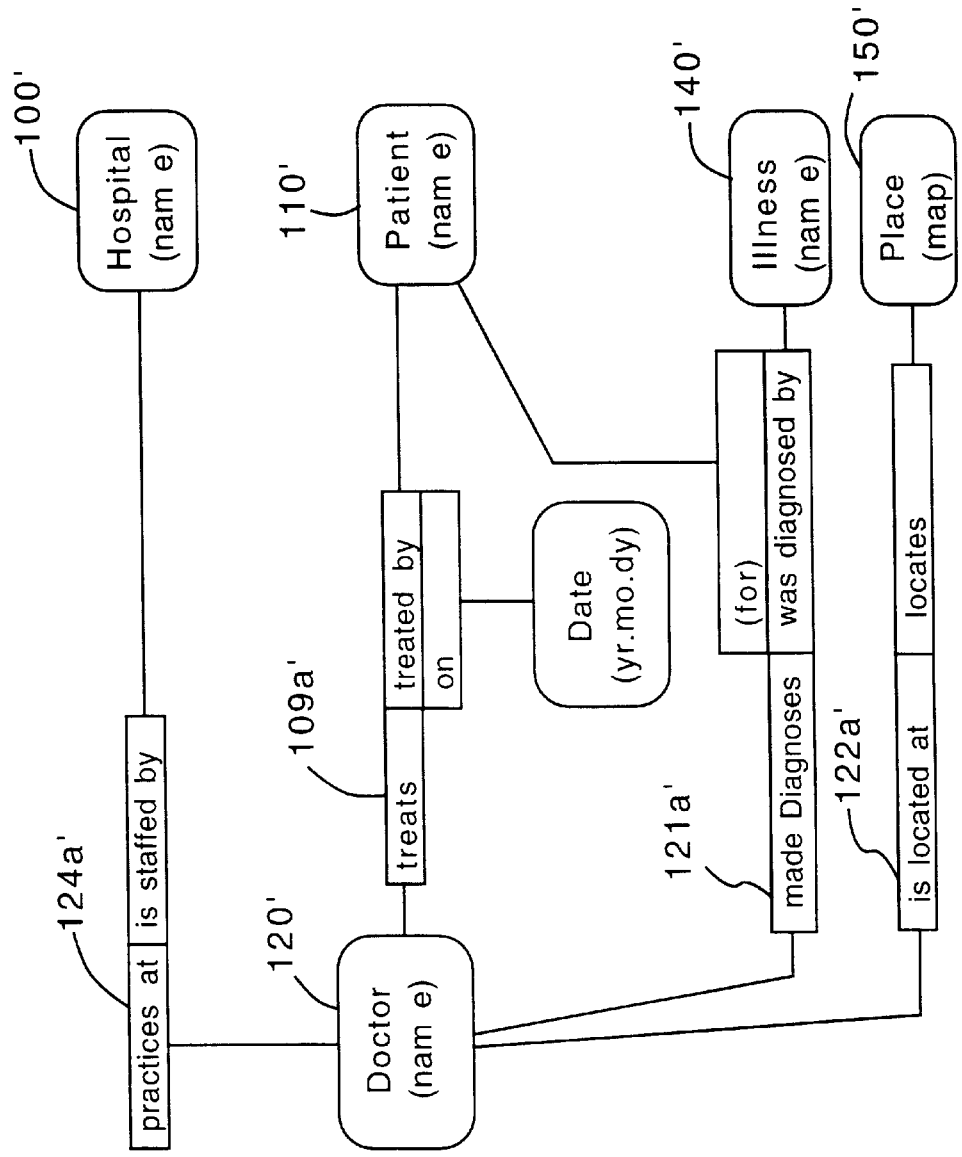
FIG. 19 shows the accompanying object-role schema used to produce the page representation for FIG. 18.

From the hyperlink "Dr. Joanne Katz", a "Dr. Joanne Katz" page is dynamically produced retrieving information on Dr. Joanne Katz as shown in FIG. 18. The "Dr. Joanne Katz" page shows a list of "patients" "treated", the "diagnosis made", the "hospital" she practices at and a map of where the hospital is. The schema that produces this page is illustrated in conjunction with FIG. 19. This shows that the object "doctor" 120' is hyperlinked via the relationship "practices at" 124a' to the object hospital 100'. Similarly, the object doctor 120' is linked via the relationship "treats" 109a' to the object "patient" 110'. In addition, relations 121a' and 122a' link the object "doctor" 120' to the object "illness" 140' and "place" 150'.

Using the "Dr. Joanne Katz" page and clicking on one of the diagnoses made by Dr. Katz such as the "bronchiolitis" diagnosis will produce a "bronchiolitis page" which displays information about the illness "bronchiolitis." In the illustrated example, the illness bronchiolitis shows cases of it being recorded and general information about the illness. A more elaborate implementation could easily retrieve listings in medical literature, statistics and so forth about this disease. The bronchiolitis information displayed includes patients who suffer from the disease such as "Andy Green" and two instances of John Kelly. Clicking on Andy Green or John Kelly will navigate back to the Andy Green or a John Kelly patient page.

The schema which provides the page of FIG. 20 is illustrated in conjunction with FIG. 21 includes the object illness 140' which maps to object "illness symptoms" 180' and "patient" 120' via relationships "has symptoms" and "was suffered by" 142a' and 144a', respectively.

Referring now to FIG. 22, the complete schema used in the example of FIGS. 9–21 is shown. The complete schema includes the objects "hospital" 100', "patient" 110', "doctor" 120', "illness" 140', "place" 150', and "illness symptoms" 180' as well as relationships between these objects to provide the requisite hyperlinks.

A general format for a data structure representing relations between objects is shown in Table 2.

TABLE 2

FORMAT:
Objectl;Object2;Role;extractorType;extractorcode;owner;numberOfSubstitutions;Substitutions;PropagateOnAnswerColumn As shown above in TABLE 2, the fields "Object1" and "Object2" are respectively the referencing and referenced objects of a relation. The field "Role" is the relation between the referencing and referenced object. The field "extractorType" is an identifier of the type of query, e.g., text based or SQL. The "extractorCode" is the code used to execute the query type to retrieve information from the database. The "owner" is a field which is used to identify the owner of the entry. The owner field permits various schemas to co-exist using common relational or text databases. The field "numberofsubstitutions" is the execution parameter that is used. The field "PropagagesOnAnswerColumn" is the column in the database where the parameter is found.

Specific examples for the data structure for each of the object-object relationships is shown in Table 3.

TABLE 3

Hospital;Doctor;Staffedby;sql;select name from Doctor
where hospital="%s";me;1,O1;1;
Patient;Hospital;Visited Hospital;sql;select hospital+
"("+fromdate+"-"+todate+")", hospital from patient visit
where patient="%s";me;1;O1;2;
Patient;Illness;Suffered from;sql;select
Illness+"on"+TreatmentDate, Doctor from PatientTreatment
where Patient="%s";me;1;O1;2;
Doctor;patient;Treated;sql;select Patient from
PatientTreatment where doctor="%s";me;1;O1;1;
Doctor;Illness;DiagnosesMade;sql;selecctIllness.name+"("+
Illness.Description+")", Illness.name from Illness,
PatientTreatment where
PatientTreatment.illness=illness.name and
Doctor="%s";me;1;O1;2;
Doctor;Hospital;Practices Medicine At;sql;select Hospital
from doctor where Name="%s";me;1;O1;1;
Illness;Patient;suffered by Patient;sql;select Patient
from PatientTreatment where Illness="%s";me;1;O1;1;
Illness;IllnessInfo;General Information;sql;select Info
from IllnessInfo where Illness-"%s";me;1;O1;0;
Hospital;Location;is located at;sql;select "<img
src="+URL+"><p>Directions: "+Directions from Location
where Place="%s";me;1;O1;0;
Doctor;Location;is located at;sql;select "<img
src="+URL+"><p>Directions: "+Directions from Location
where Place="%s";me;1;O1;0;

Having described preferred embodiments of the invention, other embodiments incorporating its concept may be used. It is felt, therefore, that this invention should not be limited to the disclosed embodiment, but rather should be limited only by the spirit and scope of the appended claims.

What is claimed is:

1. A schema base data structure to interface a database to a web browser, permitting the web browser to navigate through the database comprises:

first and second fields for representing referencing and referenced object classes;

a relationship field for representing a relationship between the first and second objects;

extraction command fields to retrieve instances of the class from an underlying database; and use rules for parsing parameters used in the database retrieval to produce transversable links based on a relationship between the first and second objects, and to represent retrieved instances of the class in at least one web page.

2. The data structure of claim 1 further comprising an identification field for uniquely identifying the owner of the entry in the schema base.

3. The data structure as recited in claim 2 further comprising a field having formatting rules for providing output objects formatted into web pages.

4. The data structure as recited in claim 2 wherein the first and second fields correspond to conceptual objects; and the relationship field corresponds to a relationship between the first and second conceptual objects;

the extraction command field has a type field to identify a database type interfaced by the data structure.

5. The schema base as recited in conjunction with claim 4 wherein the first and second conceptual objects provide first and second web pages when navigated by a web browser and the relationship field provides a hyperlink between the first and second web pages.

6. A method of operating a web browser to retrieve information in a database on a computer network comprises:

providing a schema base which represents information in the database as classes of objects and relations between classes of objects;

executing one or more search queries for a selected instance of a class object; and generating a web page to place hyperlinks on the page corresponding to relationships between selected objects and object instances in the schema.

7. The method of claim 6 further comprising:

retrieving intrinsic data about the object and wherein generating a web page inserts the instrinsic data about the object on the page.

8. The method of claim 7 wherein generating a web page provides hyperlinks back to the database for subsequent instances of generating web pages.

9. The method as recited in conjunction with claim 8 wherein:

selecting a class of objects further comprises parsing the schema base for occurrences of the requested class; and determining an existence of an instance or instances of the requested class.

10. A method of operating a web browser to retrieve information in a text-based or a relational database in a computer network comprises:

selecting a named class of objects from a plurality of available named classes of objects contained in a schema base;

retrieving relations from the schema base defining roles played by the selected named object class in relation to roles played with others of the plurality of named object classes contained in the schema base;

executing one or more search queries for each found named class occurrence from the schema base;

retrieving instances of related named objects identified by a relation between the selected named object class; and generating a web page to place hyperlinks corresponding to the relationships between the selected named object and other object instances in the schema.

11. The method of claim 10 further comprising:

retrieving intrinsic data about the named object and wherein generating a web page inserts the instrinsic data about the object on the page.

12. The method of claim 11 wherein generating a web page provides propagation of hyperlinks back to the relational database for subsequent instances of generating web pages.

13. The method as recited in conjunction with claim 12 wherein:

selecting a class of objects further comprises parsing the schema base for occurrences of the requested named class;

determining an existence of an instance or instances of the requested named class.

14. The method as recited in conjunction with claim 13 wherein retrieving relations further comprises:

searching the schema base to obtain roles of the requested named class corresponding to relationships with one or more objects in the schema base.

15. The method of claim 6 wherein the schema base maps an act of browsing web pages to querying a relational database.

16. The method of claim 6 wherein the schema base specifies some or all permitted states and transactions of the database.

17. The method of claim 6 wherein the database is a relational database.

18. The method of claim 17 wherein the relational database represents information in tables and relationships and wherein the relationship between tables are classified by a relation type.

19. The method of claim 6 wherein the schema base specifies information that should be retrieved to represent information about an object and relations or roles that the object has with respect to other objects.

20. A system for navigating a relational database comprises:

a computer system storing a schema base that represents information in an underlying relational database, has classes of objects and relations between classes of objects, the schema base specifies information that should be retrieved to represent information about an object and roles that the object has with respect to other objects and to enable execution of one or more search queries for instances of a class object;

a process for generating a web page to place hyperlinks on the page corresponding to relationships between selected objects and object instances in the schema base;

wherein the objects provide web pages when navigated by a web browser.

21. The system of claim 20 wherein the schema base provides an interface between a web browser to querying a relational database.

22. The system of claim 20 wherein the schema base specifies some or all permitted states and transactions of the database.

23. The system of claim 20 wherein the system is a server computer that provides assess to the schema base by clients running web browsers.

24. The system of claim 23 wherein the relational database resides on a database server and represents information in tables and relationships and wherein the relationship between tables are classified by a relation type.

* * * * *